(12) United States Patent
Zayas

(10) Patent No.: US 6,672,255 B1
(45) Date of Patent: Jan. 6, 2004

(54) FLUE GAS ENERGY TRANSFER SYSTEM

(76) Inventor: Carlos Zayas, 147 W. 230th St., Apt. 1E, Bronx, NY (US) 10463

( * ) Notice: Subject to any disclaimer, the term of this patent is extended or adjusted under 35 U.S.C. 154(b) by 0 days.

(21) Appl. No.: 10/298,713

(22) Filed: Nov. 18, 2002

(51) Int. Cl.[7] .................................................. F22B 33/02
(52) U.S. Cl. ...................................... 122/7 R; 122/20 B
(58) Field of Search ........................... 122/7 R, 20 B, 122/421

(56) References Cited

U.S. PATENT DOCUMENTS

| | | | |
|---|---|---|---|
| 4,079,885 A | | 3/1978 | Decker |
| 4,210,102 A | | 7/1980 | Dosmann |
| 4,334,518 A | * | 6/1982 | Ort .............................. 126/514 |
| 4,678,116 A | * | 7/1987 | Krishnakumar et al. .. 236/25 A |
| 4,938,172 A | | 7/1990 | Belovarac |
| 5,271,378 A | * | 12/1993 | Herold ..................... 126/360.2 |
| 5,347,958 A | * | 9/1994 | Gordon, Jr. ............... 122/20 B |
| 6,357,396 B1 | | 3/2002 | Stansfield |

* cited by examiner

Primary Examiner—Gregory Wilson
(74) Attorney, Agent, or Firm—Natter & Natter; Howard Natter

(57) ABSTRACT

A flue gas energy transfer system for increasing the efficiency of hot-water and/or steam boiler. They system utilizes an arrangement of heat transfer ducts with damper elements for the selective diverting exhaust combustion gases. The heat transfer ducts transmit the exhaust gases for contiguous contact with the boiler for conductive heat transfer. The heated gases are retained within the transfer duct after boiler shutdown for maintaining an elevated water temperature.

15 Claims, 3 Drawing Sheets

FLUE GAS ENERGY TRANSFER SYSTEM

BACKGROUND OF THE INVENTION

1. Field of the Invention

This invention relates generally to energy transfer and especially to a heat recovery system for liquid heaters.

In particular, the flue gas energy transfer system of this invention concerns a subsidiary heat off-take for boilers.

2. Background Information

Liquid boilers used for low-pressure steam and hot water installations typically have a pressure vessel divided interiorly into water filed sections, tubes and/or coils. The liquid is separated from a combustion zone by a heating surface. And an oil or gas fired burner produces radiant energy and combustion gases for heating the liquid. The combustion gases are usually exhausted through a flue and discharged into the atmosphere through a chimney.

Various systems have been developed for recuperating heat from exhaust combustion gases. For example, U.S. Pat. No. 6,357,396 describes an apparatus for exchanging heat from the exhaust gas to preheat combustion air. A method for utilizing waste heat for heating room air is discussed in U.S. Pat. No. 4,079,885. U.S. Pat. No. 4,938,172 discloses the use of exhaust gases for supplementary heating of hot water. A heat recovery system wherein furnace exhaust gases are used to transfer heat to water coils is shown in U.S. Pat. No. 4,210,102.

The above systems however, do not provide subsidiary heating directly to the boiler for improving boiler performance.

BRIEF SUMMARY OF THE INVENTION

Briefly, the nature of this invention concerns a flue gas energy transfer system adapted for hydronic boilers. These boilers frequently include a combustion chamber which generates hot gases for heating a fluid medium contained within the boiler. The combustion gases are discharged, usually through a duct network, for release into the atmosphere. The energy transfer system of this invention recovers the waste heat. This is achieved by an arrangement of dampers, within the duct network. The dampers are selectively actuated for redirecting heated exhaust gases through auxiliary ducts placed contiguous to the boiler wherein heat is conductively transferred from the combustion gases to the fluid contained within the boiler. In accordance with the energy transfer system of this invention, the heated exhaust gases can be retained within the auxiliary duct after boiler shutdown to reduce heat loss. The system of this invention also encompasses automated control for sequencing the operation of the boiler.

Having thus summarized the invention, it will be seen that it is a preferred object thereof to provide a flue gas energy transfer system of the general character described herein for improving thermal efficiency of a boiler.

Another preferred object of this invention is to provide a flue gas energy transfer system with increased boiler capacity for higher peak loads.

A still further preferred object of this invention is to provide a flue gas energy transfer system with decreased demand time for reaching optimum operating temperature.

Yet still further preferred object of this invention is to provide a flue gas energy transfer system for maintaining operating temperature for a longer duration after boiler shutdown.

Still yet another object of this invention is to provide a flue gas energy transfer system with reduced stack exit temperatures.

Yet another preferred object of this invention is to provide a flue gas energy transfer system providing for boiler operation at lower draft pressures.

With these ends in view, the invention finds embodiment in certain combinations of elements and arrangements of parts by which the aforementioned preferred objects and certain other objects are hereinafter attained, all as more fully described with reference to the accompanying drawings and the scope of which is more particularly indicated in the appended claims.

BRIEF DESCRIPTION OF THE DRAWINGS

In the accompany drawings, in which is shown an exemplary embodiment in accordance with the principles of the invention.

DESCRIPTION OF THE INVENTION

With specific reference now to the figures in detail, it is to be stressed that the particulars shown are by way of example and for the purposes of illustrative discussion of the preferred embodiment of the present invention and is presented in the cause of providing what is believed to be the most useful and readily understood description of the principles and conceptual aspects of the invention. In this regard, no attempt has been made to show structural aspects of the invention in more detail than is necessary for a fundamental understanding of the invention, the description taken with the drawings should make it apparent to those skilled in the art how the invention may be embodied in practice.

Figure 1:
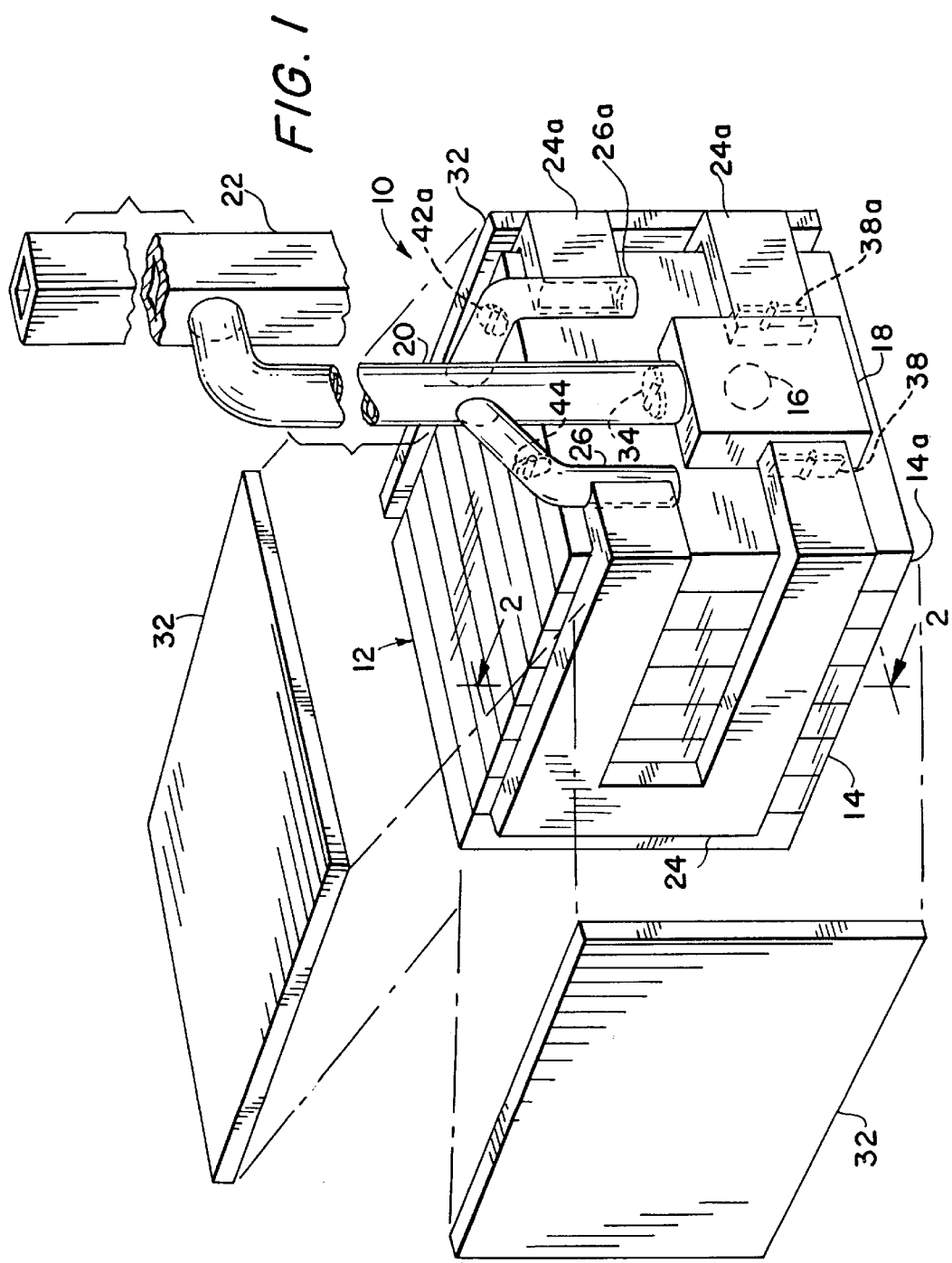
FIG. 1 is a perspective view of a boiler incorporating the flue gas energy transfer system of this invention.

Referring now in detail to FIG. 1 of the drawings, there is shown a flue gas energy transfer system 10 in accordance with this invention as applied to a boiler 12. For the purpose of this illustrative description, the boiler 12 is a commercial hot water boiler fired internally by a gas, oil, or combination gas oil burner (not shown). It should be further understood that although the flue gas energy transfer system 10 of this invention, will be described with reference to a tankless hot water boiler 12, such as manufactured by Weil-McLain, it finds the application with a wide selection of boilers including water-tube boilers and boilers for generating steam.

The boiler 12 is constructed with multiple boiler sections 14 that surround a combustion chamber. The sections 14 contain a fluid medium 15, such as water, and are connected by piping (not shown) for supplying circulating water within the sections 14. A rear boiler section 14a includes a port 16 for exhausting combustion gases generated in the combustion chamber. The exhaust gases enter at flue collector hood 18 and are vented through a main flue pipe 20, typically having a circular cross-section, and a stack or chimney 22, for discharge into the atmosphere. Although this invention is described with a rear exhaust boiler, the system 10 is also adaptable for use with a top exhaust boiler.

In accordance with this invention, a set of auxiliary heat transfer ducts 24, 24a are each connected at a respective end, to the flue collector hood 18. An opposite end of each of the heat transfer ducts 24, 24a is connected to a respective branch connector pipe 26, 26a feeding into the main flue pipe 20. The auxiliary heat transfer ducts 24, 24a are preferably rectangular in cross-section and, for example, have a width dimension of 2" inches, a depth dimension of 8" and are fabricated of sheet metal or other heat conductive material. The transfer ducts 24, 24a, extend along opposite sides of the boiler 12 in a circuitous path for maximizing the surface area in contiguous contact with the boiler sections 14. It should be apparent that the duct configuration and circuitous path may be modified for achieving optimum heat transfer; preferably a majority of the span length between the collector hood 18 and branch connector pipe 26 is in surface contact with the boiler 12.

Figure 2:
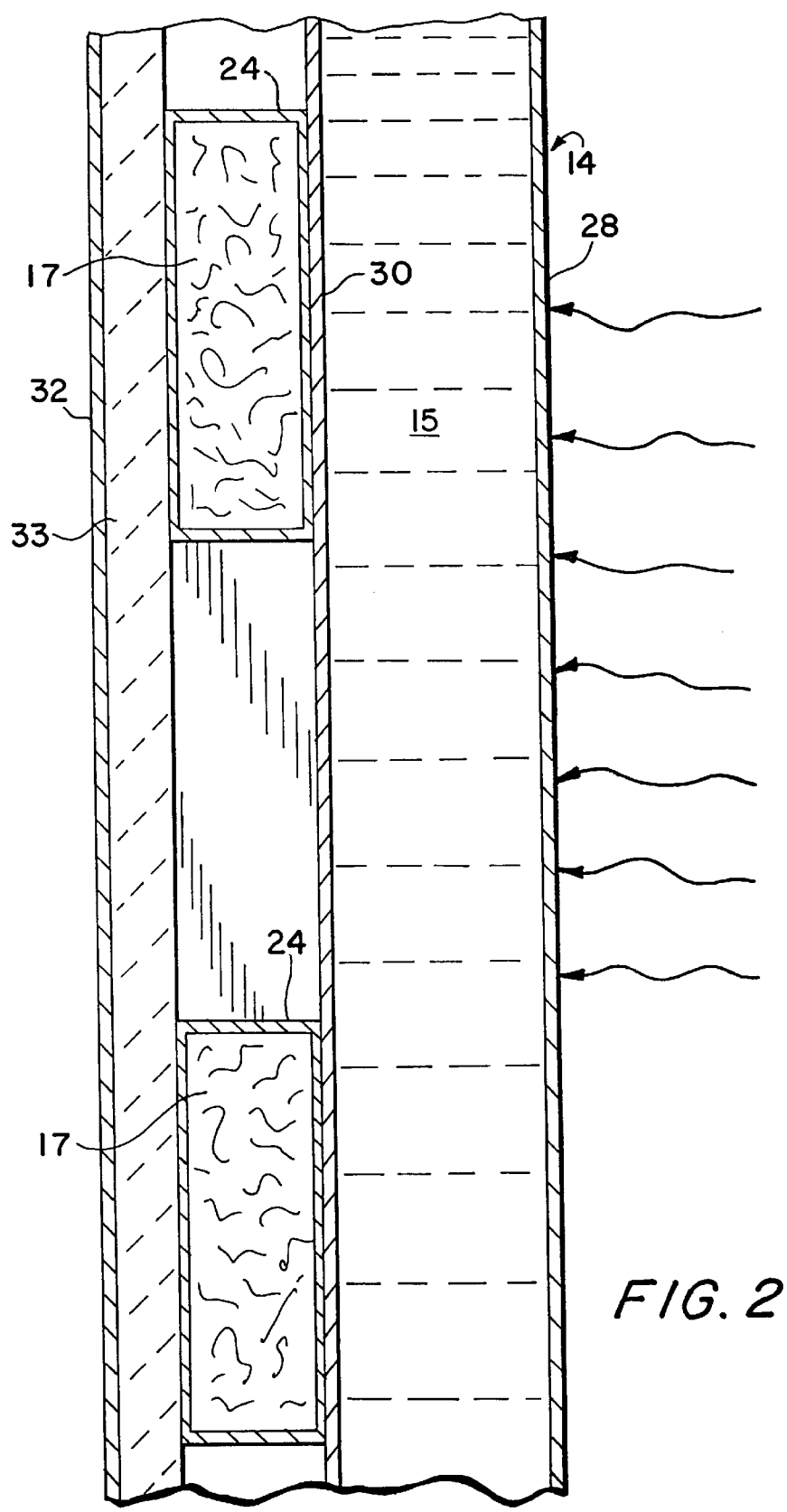
FIG. 2 is a sectional view to an enlarged scale taken substantially along line 2—2 of FIG. 1.

With reference now to FIG. 2, there is shown a sectional view through the boiler section 14 and the auxiliary heat transfer duct 24. The boiler section 14, as previous mentioned, surrounds the combustion chamber. An interior wall 28 of the boiler section 14, interfaces with the combustion chamber and provides a primary heating surface in direct contact with the combustion gases. An exterior wall 30 of the boiler section 14, provides a secondary heating surface. The walls 28, 30 are preferably constructed of steel or cast iron. The water 15 is subjected to heat energy, through radiation and convection as the hot combustion gases (illustrated by the wavy arrows) contact the interior wall 28. The exhaust gases 17 within the auxiliary heat transfer ducts 24, 24a provide supplemental heat energy by conduction through the exterior wall 30. The additional heat decreases the time for the boiler to reach optimum operating temperature. A panel or jacket 32, fabricated with an insulating material 33, is placed over the ducts 24, 24a to reduce heat loss. The heat retention also maintains the boiler operating temperature for longer duration of time after shutdown.

Figure 3:
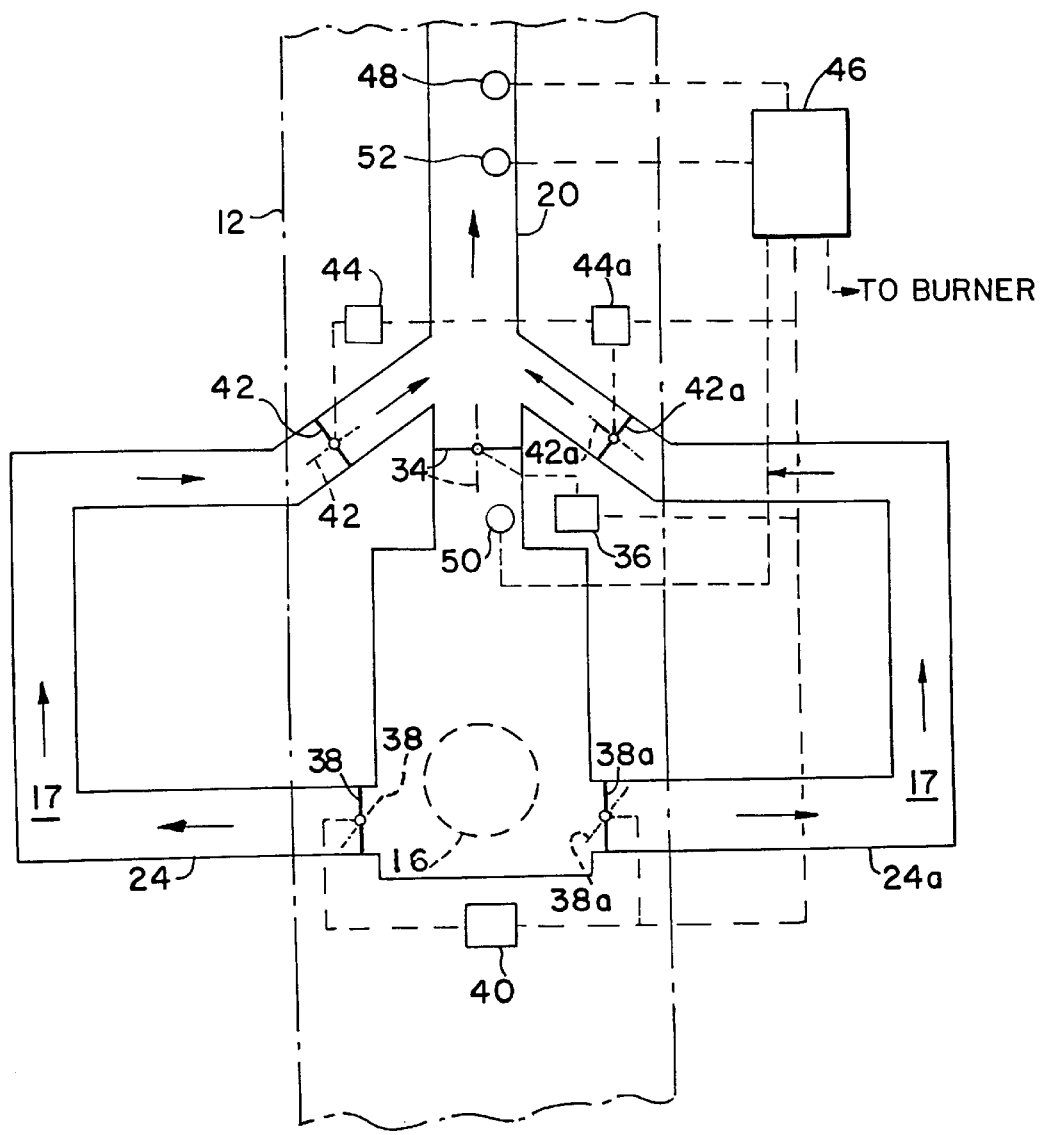
FIG. 3 is a schematic drawing illustrating the operation of the heat recovery system.

The exhaust gas discharge is controlled by a plurality of damper members as will further be discussed with reference to FIG. 3. A flue damper member 34, is located within the main flue pipe 20. The damper member 34 is mounted for incremental rotational displacement for controlling passage of exhaust gases and may be manually set or, preferably automatically controlled by a motor 36. The auxiliary heat transfer ducts 24, 24a contain a set of intake damper members 38, 38a, preferably controlled by a motor 40 for incremental settings. Another set of adjustable vent damper members 42, 42a are preferably respectively controlled by a motor 44, 44a. This arrangement provides independent operation of each damper member 42, 42a, for compensatory venting in the event of unbalanced exhaust gas flow. The motors 36, 40, 44, 44a are actuated by a control module 46, such as a microprocessor, or equivalent type controller. The control module 46 also provides for on-off operation of the burner and incorporates safety features through communication with a temperature sensor 48, a barometric pressure sensor 50 and a smoke detector 52 located in the main flue pipe 20 or the chimney 22 or elsewhere.

The operation of the energy transfer system of this invention will now be described. When the boiler 12 is in the "off" mode, each of the respective damper members 34, 38, 38a, 42, 42a is in a closed position with the respective flow paths through the main flue pipe 20 and the auxiliary transfer ducts 24, 24a being blocked. If the boiler 12 is to be operated in an alternate mode, without utilizing the auxiliary heat transfer ducts 24, 24a, then the damper member 34 is placed in the "open" position (shown in broken-line); the damper members 38, 38a, 42, 42a remain in the "closed" position (shown in solid-line), and the exhaust gases exit through the main flue pipe 20.

When the automatic control mode is operational, the control module 46 will respond to a heating load "demand" by initiating a signal to actuate the burner. After a burner flame is sensed, a command signal will be transmitted to actuate the motor 36 for opening the damper member 34. The control module 46 will also send a command signal to actuate the motors 40, 44, 44a for opening the respective damper members 38, 38a, 42, 42a; simultaneously the motor 36 will receive a signal to close the damper member 34. This will establish a flow path (illustrated by the arrows) for the exhaust gases 17, through auxiliary transfer ducts 24, 24a, the respective branch connector pipes 26, 26a and the main flue pipe 20, When there is no longer a "demand" for heat, as detected by the control module 46, the burner is shutdown and the damper motors 40, 44, 44a close the respective damper members 38, 38a, 42, 42a thus retaining the hot exhaust gases 17 within the auxiliary transfer ducts 24, 24a.

By way of example, the water 15, within the boiler sections 14, was found to reach an operational temperature of 150° F. within 1 minute from receipt of a heat "demand". The same boiler, without the energy transfer system of this invention, required a duration of 3 minutes to reach the same operational temperature. Furthermore, after the burner shutdown the temperature continued to rise to 170° F. within the next 3 minutes, whereas the boiler operating without the system of this invention, reached a maximum temperature of only 165° F. after burner shutdown. The accelerated rate of increase in water temperature provides for a shorter operating cycle resulting in energy savings and less pollution.

A comparison of stack temperatures was also investigated and it was determined that with the system of this invention, a maximum stack (chimney) exit temperature of 140° F. was reached 1 minute after receipt of heat "demand" (at boiler operational temperature) and that the stack temperature dropped to 80° F., 5 minutes after burner shutdown. The boiler operation without the system of this invention reached a stack temperature of 190° F. in 3 minutes of heat "demand" (at boiler operational temperature) and after burner shutdown the temperature dropped to 100° F. The stack temperature is directly proportional to heat loss; the lower stack temperature with this system is indicative of improved thermal efficiency.

In view of the above results it should be apparent that the energy transfer system of this invention will effect a reduction in burner fuel consumption for the reason that the optimum water temperature can be reached in a shorter time frame and the temperature can be maintained for a longer time duration after boiler shutdown thus providing improved boiler performance, energy conservation, and a cost reduction in operation.

It is also within the scope of this invention to monitor and regulate stack temperature, as by use of temperature sensor 48 and by automatically adjusting the setting of the damper members 34, 38, 38a, 42, 42a for example, by using a feed-back loop. The draft control is also automatically maintainable by a feed-back loop from the pressure sensor 50. The detector 52 will transmit a signal to the control module 46 when unsafe smoke conditions arise. The module 46 will activate an alarm and simultaneously shutdown the burner. An automatic burner re-start e.g. after 2 minutes, can be programmed in the system.

It should also be noted that the energy transfer system of this invention can be used as a retrofit to existing boilers or integrated as part of a new boiler installation. Thus it should be seen that there is provided a flue gas energy transfer system which achieves the various preferred objects of this invention and which is well adapted to meet conditions of practical use. Since other various possible embodiments might be made to the present invention or modifications might be made to the exemplary embodiment set forth above, it is to be understood that all materials shown and described in the accompanying drawings are to be interpreted as illustrative and not in a limiting sense.

Having thus described the invention, there is claimed as new and desired to be secured by Letters Patent:

1. A flue gas energy transfer system adapted for use with an internally fired boiler having a combustion chamber providing a heat source for a fluid medium contained within the boiler, said boiler including a collector member for receiving heated exhaust gases from the combustion chamber, said transfer system of this invention comprising a flue pipe in communication with the collector member for discharging combustion gases into the atmosphere, an auxiliary heat transfer duct in communication with the collector member, said heat transfer duct selectively providing an alternative flow path for the exhaust gases from the collector member to the flue pipe, a damper member within the respective flue pipe and the heat transfer duct, for selectively diverting the exhaust gases to the alternative flow path, with said heat transfer duct being in contiguous contact with the boiler for heat transfer from the exhaust gases to the contained fluid medium.

2. A flue gas energy transfer system as claimed in claim 1 further including an intake damper member in the heat transfer duct proximate the collector member and a vent damper member proximate the flue pipe.

3. A flue gas energy transfer system as claimed in claim 1 wherein the damper member in the flue pipe is proximate the collector member.

4. A flue gas energy transfer system as claimed in claim 1 wherein said damper members are motorized and adapted for automatic control.

5. A flue gas energy transfer system as claimed in claim 2 wherein the damper member in said flue pipe is adapted to remain in an open position and the intake damper member and the vent damper member are adapted to remain in a closed position for boiler operation without auxiliary heating.

6. A flue gas energy transfer system as claimed in claim 2 wherein the flue pipe damper member is placed in a closed position and the intake damper member and the vent damper member of the heat transfer duct are placed in an open position with the flow path for exhaust gases being through the heat transfer duct for providing supplemental heating to the fluid contained within the boiler.

7. A flue gas energy transfer system as claimed in claim 2 wherein the intake damper member and the vent damper member are displaceable to a closed position for retaining the exhaust gases within the transfer duct.

8. A flue gas energy transfer system as claimed in claim 2 wherein the respective damper members are motorized and linked to a control module for automatic actuation.

9. A flue gas energy transfer system as claimed in claim 1 further including a temperature sensor, said temperature sensor being located in the flue pipe, a control module for automatic operation of the damper members, said control module being responsive to said temperature sensor for regulating operation of the damper members.

10. A flue gas energy transfer system as claimed in claim 1 further including a pressure sensor, said pressure sensor being sensitive to the draft within the flue pipe, a control module member being responsive to the pressure sensor for adjustable operation of the damper members.

11. A flue gas energy transfer system as claimed in claim 1 further including a smoke detector linked to a control module, said control module being responsive to a unsafe smoke conditions for effecting a burner shutdown.

12. A flue gas energy transfer system as claimed in claim 1 further including a branch connector pipe intermediate the heat transfer duct and the flue pipe.

13. A flue gas energy transfer system as claimed in claim 1 further including an insulating jacket member, said jacket member being positionable in overlying relationship with respect to the heat transfer duct for heat retention.

14. A flue gas energy transfer system as claimed in claim 1 wherein the heat transfer duct is in contiguous contact with the boiler for a majority of the length of the alternative flow path for conductive heat transfer.

15. A flue gas energy transfer system adapted for use with an internally fired boiler having a combustion chamber providing a heat source for a fluid medium contained within the boiler, said boiler including a collector member for receiving heated exhaust gases from the combustion chamber, said transfer system of this invention comprising a flue pipe for discharging combustion gases from the collector member into the atmosphere, an auxiliary heat transfer duct in communication with the collector member, said auxiliary heat transfer duct and flue pipe including damper means for selectively diverting the exhaust gases through the heat transfer duct to the flue pipe, said heat transfer duct being in contiguous contact with an exterior wall of the boiler for a majority of its length for transferring heat from the exhaust gases to the fluid medium contained within the boiler.

* * * * *